(No Model.)
P. OPPER & H. CHALL.
FLUE CLEANER.
No. 263,349.  Patented Aug. 29, 1882.
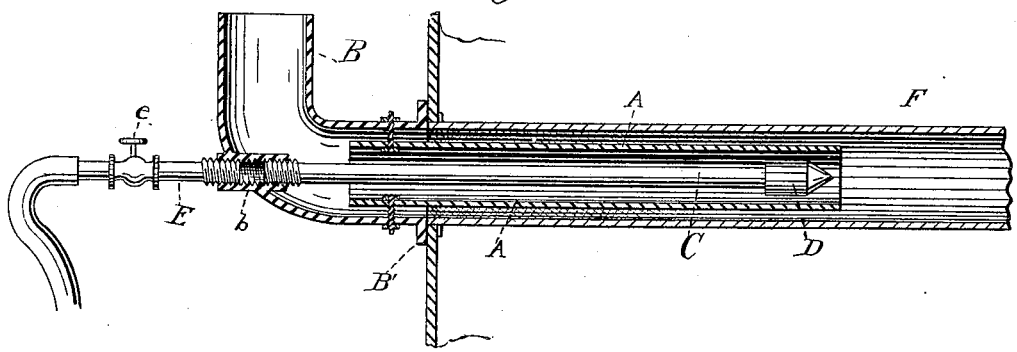
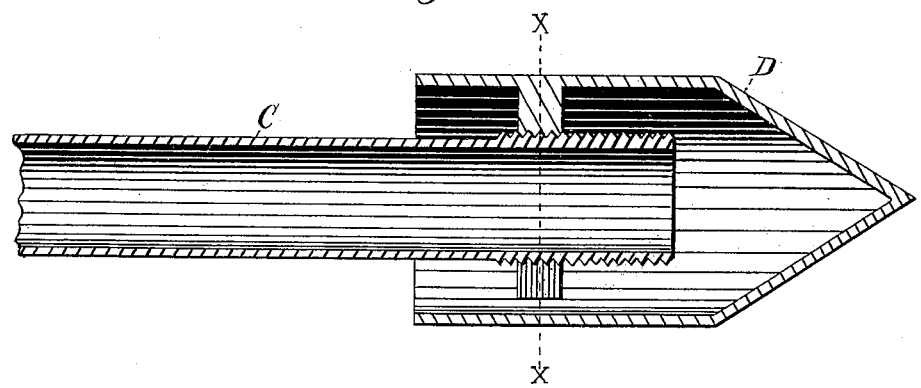
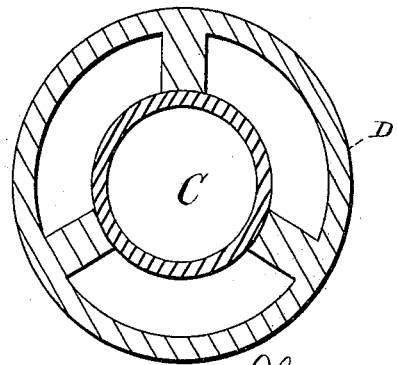

UNITED STATES PATENT OFFICE.

PHILIP OPPER AND HERMANN CHALL, OF CLEVELAND, OHIO.

FLUE-CLEANER.

SPECIFICATION forming part of Letters Patent No. 263,349, dated August 29, 1882.

Application filed June 26, 1882. (No model.)

*To all whom it may concern:*

Be it known that we, PHILIP OPPER and HERMANN CHALL, of Cleveland, in the county of Cuyahoga and State of Ohio, have invented certain new and useful Improvements in Flue-Cleaners; and we do hereby declare the following to be a full, clear, and exact description of the invention, such as will enable others skilled in the art to which it pertains to make and use the same.

Our invention relates to flue-cleaners, and more particularly to that class known as "steam flue-cleaners," and is particularly adapted for use in cleaning the tubes or flues of a boiler.

It consists in introducing steam into the flue by means of a pipe, which by suitable mechanism is forced to return and discharge itself into the smoke-stack or chimney, thereby creating a suction-draft which will draw the soot and all other foreign matter out of the flue.

In the drawings, Figure 1 represents a partially-sectional view of our device inserted in the flue of a boiler. Fig. 2 is an enlarged view of the conical-shaped deflector and steam-pipe. Fig. 3 represents a transverse cross-section of the same, taken through the line $x$ $x$ in Fig. 2.

A represents a section of pipe or tube, which is secured at one end to another piece of pipe, B, which forms an elbow and is somewhat larger in its circumference than the pipe A. They are preferably secured together by means of bolts, said bolts being permanently attached to the pipe A and passing through the pipe B, where they are secured by means of nuts.

A pipe, C, is secured in a socket, $b$, that is formed in the pipe B. The pipe may be attached to said socket in any suitable manner. It extends from the socket on the inside of the pipe B forward, passing into the pipe A, as shown in Fig. 1. At the end of this pipe C a deflector, D, is secured. This deflector may be made in any desirable form, so that it accomplishes the object in view.

In Figs. 2 and 3 is represented a tube having a conical-shaped end. This forms a hollow receptacle which covers the end of the pipe C. It being larger in its circumference than said pipe, it leaves a return-passage for the steam. This deflector is secured to the pipe by means of set-screws, or in any other suitable manner, one form being shown in the drawings, which consists in having lugs formed on the inside of the deflector, said lugs or ears being threaded on the ends. The pipe C being also threaded at the end will allow the deflector to be screwed on the pipe. This leaves the necessary openings for the passage of the steam.

To introduce steam into the pipe C a tube, E, is secured to the socket $b$, thus connecting the two pipes together. This pipe E is provided with a valve, $e$, for regulating the inlet of the steam, and is also connected to the boiler in any suitable manner.

A part of the construction of the above-described device may be dispensed with. The device will operate substantially the same without the tube A, the object of this tube being to protect the flue from the steam escaping from the pipe C, for when the flue is dampened by the steam the soot gathers more readily in it.

The operation of our device is as follows: The pipe E is connected to a steam-nozzle of the boiler. The pipes A and C are then inserted into one of the flues to be cleaned. The elbow B is pressed against the end of the flue F in order to make a tight joint. A flange, B', may be secured to this end of the elbow, so as to completely cover the opening of the flue. Valve $e$ is now opened, which admits the steam into the pipe E, from whence it rushes down through the pipe C into the deflector D, which deflects the steam through the openings $g$ into the pipe A, from whence it discharges itself through the elbow B, thereby creating a powerful current of air through the open flue, thus clearing out its soot and other impure matter.

We claim—

1. The process herein described of cleaning boiler-flues by steam, consisting in inserting in a flue a steam-pipe having its outlet so obstructed that the steam passing through the pipe will be forced back and escape through the same end of the flue in which the steam-pipe is inserted, thereby exhausting the air from the flue, and during the process of exhaustion driving out any foreign matter there may be in the flue, substantially as and for the purpose described.

2. A flue-cleaner consisting of a steam-pipe having its end surrounded by a cap of larger diameter than the pipe, and arranged to deflect the steam back outside of the pipe after it leaves the end of the same, substantially as described.

3. In a flue-cleaner, the combination, with a steam-pipe provided with an obstructed outlet, whereby the direction of the flow of steam is reversed, of a casing surrounding the steam-pipe, through which the steam and any foreign matter in the flue may pass, substantially as and for the purpose shown and described.

4. In a flue-cleaner, the combination of the steam-pipe C and deflector D, substantially as and for the purpose shown and described.

5. In a flue-cleaner, the combination of the steam-pipe C, deflector D, and casing A, substantially as and for the purpose shown and described.

6. The combination, in a flue-cleaner, of a steam-pipe, having at one end means for deflecting the steam in a direction the reverse of its passage through the pipe, with an elbow-pipe at the other end, arranged to surround the mouth of a flue and deflect the escaping steam and soot laterally therefrom, substantially as described.

7. The combination, with the steam-pipe C, provided with a deflector at one end, of the elbow B, having the coupling-socket b, in which the other end of said steam-pipe is inserted, substantially as described.

In testimony whereof we have signed our names to this specification in the presence of two subscribing witnesses.

PHILIP OPPER.
     HERMANN CHALL.

Witnesses:
 JNO. CROWELL, Jr.,
 EMMA WRIGHT.